US010674305B2

(12) United States Patent
York et al.

(10) Patent No.: US 10,674,305 B2
(45) Date of Patent: Jun. 2, 2020

(54) REMOTE MULTI-DIMENSIONAL AUDIO

(71) Applicant: Microsoft Technology Licensing, LLC, Redmond, WA (US)

(72) Inventors: Kendall Clark York, Bellevue, WA (US); Jeffrey Sipko, Kirkland, WA (US); Aaron Krauss, Snoqualmie, WA (US); Andrew F. Muehlhausen, Seattle, WA (US); Adolfo Hernandez Santisteban, Bothell, WA (US); Arthur C. Tomlin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/922,515

(22) Filed: Mar. 15, 2018

(65) Prior Publication Data
US 2019/0289416 A1 Sep. 19, 2019

(51) Int. Cl.
*H04S 7/00* (2006.01)
*H04R 5/02* (2006.01)
(Continued)

(52) U.S. Cl.
CPC .............. *H04S 7/303* (2013.01); *G06F 1/163* (2013.01); *G06F 3/165* (2013.01); *G06F 3/167* (2013.01);
(Continued)

(58) Field of Classification Search
CPC . H04S 7/30; H04S 7/301; H04S 7/302; H04S 7/303; H04S 7/304; H04S 7/308;
(Continued)

(56) References Cited

U.S. PATENT DOCUMENTS 6,594,370 B1   7/2003   Anderson
8,717,406 B2   5/2014   Garcia et al.
(Continued)

FOREIGN PATENT DOCUMENTS

KR   1020090090771 A   8/2009
KR      101569121 B1   11/2015

OTHER PUBLICATIONS

"Fineck: The World's First Wearable Device for Your Neck", Retrieved from <<https://web.archive.org/web/20171108082601/https://www.kickstarter.com/projects/184140387/fineck-the-worlds-first-wearable-device-for-your-n>>, Nov. 8, 2017, 22 Pages.
(Continued)

*Primary Examiner* — Andrew C Flanders
(74) *Attorney, Agent, or Firm* — Holzer Patel Drennan

(57) ABSTRACT

The disclosed technology provides multi-dimensional audio output by providing a relative physical location of an audio transmitting device relative to an audio outputting device in a shared map of physical space shared between the audio transmitting device and the audio outputting device. An orientation of the audio outputting device relative to the audio transmitting device is determined and an audio signal received from the audio transmitting device via a communication network is processed using the determined orientation of the audio outputting device relative to the audio transmitting device and the relative physical location of the audio transmitting device to create an augmented audio signal. The augmented audio signal is output through at least one audio output on the audio outputting device in a manner indicating a relative physical direction of the audio transmitting device to the audio outputting device in the shared map of the physical space.

21 Claims, 6 Drawing Sheets

(51) Int. Cl.

| | | |
|---|---|---|
| H04R 1/32 | (2006.01) | |
| G06F 3/16 | (2006.01) | |
| H04R 5/04 | (2006.01) | |
| H04R 3/00 | (2006.01) | |
| H04R 3/12 | (2006.01) | |
| H04R 1/40 | (2006.01) | |
| H04B 1/3827 | (2015.01) | |
| H01Q 1/27 | (2006.01) | |
| G06F 1/16 | (2006.01) | |
| G10L 15/22 | (2006.01) | |
| H04W 4/02 | (2018.01) | |
| H04R 27/00 | (2006.01) | |

(52) U.S. Cl.
CPC .............. *G10L 15/22* (2013.01); *H01Q 1/273* (2013.01); *H04B 1/385* (2013.01); *H04R 1/323* (2013.01); *H04R 1/403* (2013.01); *H04R 3/005* (2013.01); *H04R 3/12* (2013.01); *H04R 5/02* (2013.01); *H04R 5/04* (2013.01); *H04S 7/304* (2013.01); *H04S 7/308* (2013.01); *H04W 4/02* (2013.01); *H04W 4/023* (2013.01); *H04W 4/026* (2013.01); *G10L 2015/223* (2013.01); *H04R 27/00* (2013.01); *H04R 2420/07* (2013.01); *H04R 2460/07* (2013.01); *H04S 2400/01* (2013.01); *H04S 2400/11* (2013.01)

(58) Field of Classification Search
CPC .......... G06F 3/012; G06F 3/013; G06F 3/165; G06F 3/167; G06F 1/163; G06F 1/3231; G06F 11/3058; G06F 11/3089; H04W 4/02; H04W 4/026; H04R 5/02; H04R 5/033; H04R 5/04; H04R 2460/07; H04R 2460/11
See application file for complete search history.

(56) References Cited

U.S. PATENT DOCUMENTS

| | | | |
|---|---|---|---|
| 8,718,301 | B1 | 5/2014 | Jouppi et al. |
| 9,250,703 | B2 | 2/2016 | Hernandez-Abrego et al. |
| 2003/0223602 | A1 | 12/2003 | Eichler et al. |
| 2004/0156512 | A1 | 8/2004 | Parker |
| 2008/0304707 | A1 | 12/2008 | Oi et al. |
| 2010/0245078 | A1 | 9/2010 | Nadkarni et al. |
| 2010/0316232 | A1 | 12/2010 | Acero et al. |
| 2011/0096915 | A1 | 4/2011 | Nemer |
| 2011/0096941 | A1 | 4/2011 | Marzetta et al. |
| 2012/0214544 | A1 | 8/2012 | Shivappa et al. |
| 2013/0076853 | A1* | 3/2013 | Diao ................... H04N 7/15 348/14.08 |
| 2013/0218456 | A1* | 8/2013 | Zelek ................. G01C 21/3652 701/412 |
| 2013/0272539 | A1* | 10/2013 | Kim ..................... G01S 3/8006 381/92 |
| 2013/0300648 | A1* | 11/2013 | Kim ....................... G06F 3/011 345/156 |
| 2013/0304479 | A1 | 11/2013 | Teller et al. |
| 2013/0322667 | A1* | 12/2013 | Christensen ........... H04R 5/033 381/309 |
| 2014/0219485 | A1* | 8/2014 | Jensen ................. H04R 25/405 381/313 |
| 2014/0328505 | A1 | 11/2014 | Heinemann et al. |
| 2014/0369537 | A1* | 12/2014 | Pontoppidan .......... H04R 25/00 381/314 |
| 2015/0063603 | A1 | 3/2015 | Henderek et al. |
| 2015/0100991 | A1* | 4/2015 | Risberg ................ H04L 67/104 725/80 |
| 2015/0169120 | A1 | 6/2015 | Sanchez et al. |
| 2015/0196101 | A1 | 7/2015 | Dayal et al. |
| 2015/0248791 | A1 | 9/2015 | Abovitz et al. |
| 2015/0301592 | A1* | 10/2015 | Miller ..................... G06F 3/011 345/156 |
| 2015/0373477 | A1* | 12/2015 | Norris ................ H04M 1/72572 381/303 |
| 2016/0080874 | A1 | 3/2016 | Fullam |
| 2016/0105757 | A1 | 4/2016 | Vennstrom et al. |
| 2016/0277647 | A1 | 9/2016 | Adachi |
| 2016/0379660 | A1* | 12/2016 | Wright .................... H04S 1/002 381/57 |
| 2016/0381453 | A1* | 12/2016 | Ushakov .............. H04R 1/1033 381/71.6 |
| 2017/0186236 | A1 | 6/2017 | Kawamoto |
| 2017/0318407 | A1 | 11/2017 | Meister et al. |
| 2018/0048976 | A1* | 2/2018 | Kimura ..................... H04S 1/00 |
| 2018/0116578 | A1 | 5/2018 | Tzvieli et al. |
| 2018/0249274 | A1* | 8/2018 | Lyren ...................... H04S 7/303 |
| 2018/0310116 | A1 | 10/2018 | Arteaga et al. |
| 2019/0289396 | A1 | 9/2019 | York et al. |

OTHER PUBLICATIONS

"Multi-user for Shared iOS Devices", Retrieved from <<https://www.mobileiron.com/sites/default/files/datasheets/files/DS_MobileIron_Multi-User_0.pdf>>, Oct. 20, 2017, 2 Pages.

"NeckSound", Retrieved from <<https://web.archive.org/web/20170929222247/http:/necksound.com/en/home>>, Sep. 29, 2017, 9 Pages.

"Personal Local Cloud Desktop Sync", Retrieved from <<https://web.archive.org/web/20170929124911/https:/www.egnyte.com/online-storage/personal-local-cloud-features.html>>, Sep. 29, 2017, 4 Pages.

Angelo, et al., "SIMPLE-Use—Sensor Set for Wearable Movement and Interaction Research", In Journal of IEEE Sensors, vol. 14, Issue 4, Apr. 2014, pp. 1207-1215.

Stone, et al., "Technology Innovation Enabling Ecological Momentary Assesment", In Publication of Oxford University Press, Apr. 19, 2007, 1 Page.

"Final Office Action Issued in U.S. Appl. No. 15/922,448", dated Aug. 23, 2018, 8 Pages.

"Final Office Action Issued in U.S. Appl. No. 15/922,448", dated Jan. 30, 2019, 11 Pages.

"Non Final Office Action Issued in U.S. Appl. No. 15/922,448", dated Apr. 11, 2019, 11 Pages.

Patel, Darshan, "FITT360: A Feature Rich Wearable Camera to Capture 360 Degree Snaps", Retrieved From: https://www.nimblechapps.com/wearables/fitt360-wearable-camera-to-capture-360-degree-snaps, Jan. 20, 2018, 4 Pages.

"International Search Report and Written Opinion Issued in PCT Application No. PCT/US2019/021253", dated Jun. 17, 2019, 11 Pages.

"Final Office Action Issued in U.S. Appl. No. 15/922,448", dated Jul. 15, 2019, 10 Pages.

"International Search Report and Written Opinion Issued in PCT Patent Application No. PCT/US2019/021257", dated May 23, 2019, 10 Pages.

\* cited by examiner

REMOTE MULTI-DIMENSIONAL AUDIO

CROSS-REFERENCE TO RELATED APPLICATIONS

The present application is related to U.S. patent application Ser. No. 15/922,448, entitled "Electronic Device for Spatial Output," which is filed concurrently herewith and is specifically incorporated by reference for all that it discloses and teaches.

BACKGROUND

In crowded or busy environments, it may be difficult for people to communicate with each other due to ambient noise or structural elements, such as walls. Two-way radios and other communication devices may enable communication in crowded or busy environments. However, two-way radios and other solutions do not give the listener any indication of where the speaker is located (e.g., in which direction the speaker is relative to the listener). Further, the use of two-way radios makes it difficult for more than one person to speak at a time, often meaning that additional channels are used to allow multiple conversations to happen at once.

SUMMARY

In at least one implementation, the disclosed technology provides multi-dimensional audio output for communications between a speaker and a listener. A method provides a relative physical location of an audio transmitting device relative to an audio outputting device in a shared map of physical space. The shared map is shared between the audio transmitting device and the audio outputting device. The method further determines an orientation of the audio outputting device relative to the audio transmitting device and processes an audio signal received from the audio transmitting device via a communication network using the determined orientation of the audio outputting device relative to the audio transmitting device and the relative physical location of the audio transmitting device to create an augmented audio signal. The augmented audio signal is output through at least one audio output on the audio outputting device. The augmented audio signal is output in a manner that indicates a relative physical direction of the audio transmitting device to the audio outputting device in the shared map of the physical space.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

In crowded environments, it may be difficult for people to communicate without the assistance of an electronic communication device. In many occupational situations, such as construction sites, retail stores, restaurants, or other large buildings, environmental factors such as noise, distances, and walls can make it difficult for members of a team to communicate effectively. Electronic communication devices alone typically do not provide the users with an indication of where communications (e.g., within the building) originate. In a large occupational setting, not knowing where a communication originates can cause confusion and decrease efficiency.

The disclosed technology provides communication between an audio transmitting device and an audio outputting device. Once the audio receiving device receives an audio communication from the audio transmitting device, the audio receiving device processes the audio signal to obtain an augmented audio signal. The processing is based on the relative location of the audio transmitting device relative to the audio receiving device. The audio receiving device presents the augmented audio signal in a manner that allows the user to determine where the communication originates. For example, the audio receiving device may present the augmented audio so that it is louder in a right side speaker and softer in a left side speaker, so it sounds like the augmented audio signal is coming from the right of the audio receiving device.

Figure 1A:
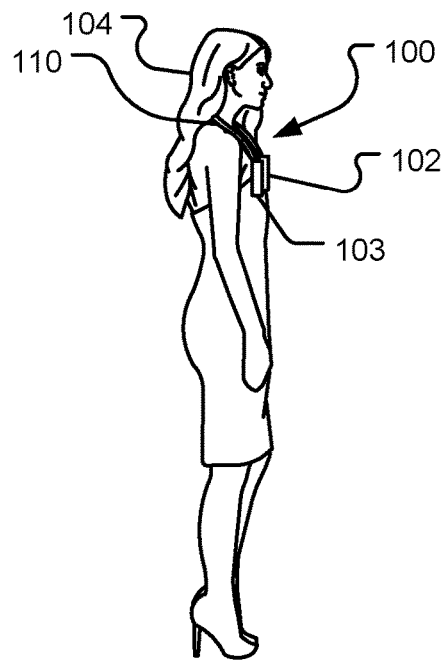
FIGS. 1A, 1B, and 1C illustrate an example device that provides multi-dimensional audio at an audio outputting device.
Figure 1B:
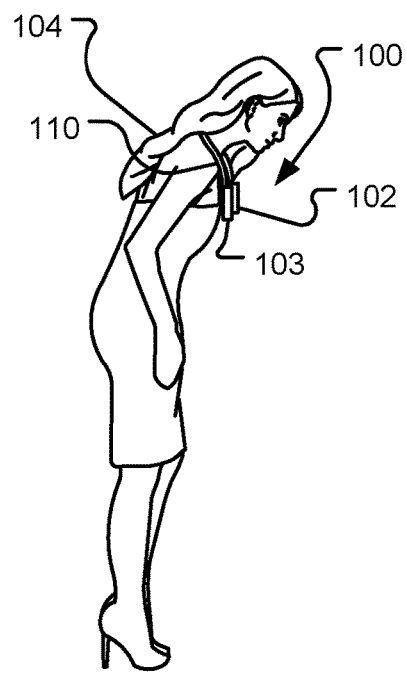
Figure 1C:
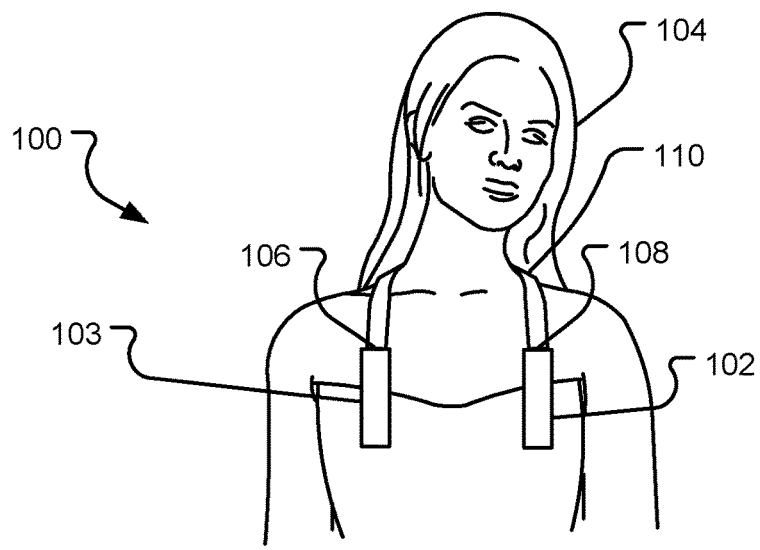

FIGS. 1A, 1B, and 1C illustrate an example audio device 100 that may be used for providing multi-dimensional audio at an audio outputting device. FIG. 1A depicts the audio device 100 in use by a user 104. The audio device 100 includes a right electronic enclosure 103 and a left electronic enclosure 102 connected by a flexible connector 110. In at least one implementation, the right electronic enclosure 103 and the left electronic enclosure 102 are of substantially equal weight so that the audio device 100 remains balanced around the neck of the user 104, particularly when the flexible connector 110 slides easily on a user's neck or collar. The flexible connector 110 may include connective wires to provide a communicative connection between the right electronic enclosure 103 and the left electronic enclosure 102. The flexible connector 110 can be draped across a user's neck, allowing the extreme ends of the right electronic enclosure 103 and the left electronic enclosure 102 to hang down from the user's neck against the user's chest. Because the audio device 100 may lie flat against the user's chest on one user but not another user, depending on the contour or shape of the user's chest, cameras in the audio device 100 may be adjustable manually or automatically to compensate for the altered field of view caused by different chest shapes and/or sizes.

FIG. 1B depicts the audio device 100 around the neck of the user 104 when the user 104 is bent over. The audio device 100 remains balanced when the user 104 bends over or moves in other directions because the right electronic enclosure 103 and the left electronic enclosure 102 are of substantially the same weight. When the user 104 bends over, the audio device 100 continues to hang at substantially the same angle relative to the ground, so that the field of view of the cameras remains the substantially the same whether the user 104 is standing straight or bending over. In one implementation, the fields of view between standing and bending over are identical, although other implementations provide a substantial overlap in the field of views of the two states: standing and bending over. Use of a wide-angle lens or a fish-eye lens may also facilitate an overlap in the field of views. The flexible connector 110 allows the audio device 100 to hang relative to the ground instead of being in one fixed orientation relative to the chest of the user 104.

FIG. 1C depicts the audio device 100, that may act as both an audio transmitting device and an audio outputting device. The audio device 100 has at least one audio input and at least two audio outputs 106 and 108. In one implementation, the audio outputs 106 and 108 are open speakers. In other implementations, the audio outputs 106 and 108 may be headphones, earbuds, headsets, or any other listening device. In at least one implementation, the audio device 100 also includes a processor, at least one camera, and at least one inertial measurement unit (IMU). In some implementations, the audio device 100 may also include other sensors, such as touch sensors, pressure sensors, or altitude sensors. Additionally, the audio device 100 may include inputs, such as haptic sensors, proximity sensors, buttons or switches. The audio device 100 may also include additional outputs, for example, without limitation, a display or haptic feedback motors. Though the audio device 100 is shown in FIG. 1 being worn around the neck of a user 104, the audio device 100 may take other forms and may be worn on other parts of the body of the user 104. As shown in FIG. 1C, the audio outputs 106 and 108 are located on the audio device 100 so that the audio output 106 generally corresponds to one ear of the user 104 and the audio output 108 generally corresponds to the other ear of the user 104. The placement of the audio outputs 106 and 108 allows for the multi-dimensional audio output. Additional audio outputs may also be employed (e.g., another speaker hanging at the user's back).

Figure 2:
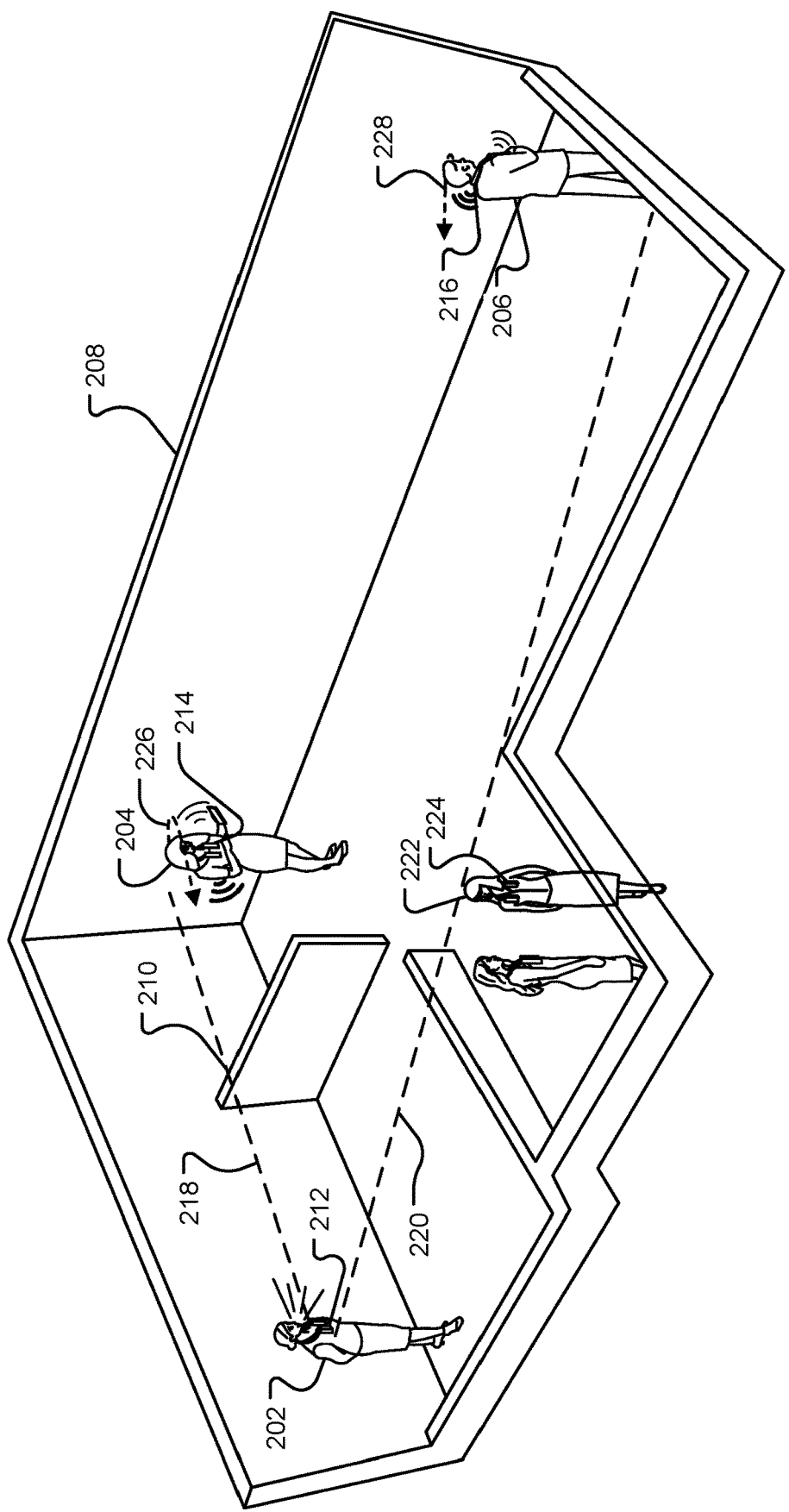
FIG. 2 illustrates an example communication providing multi-dimensional audio at two audio outputting devices.

FIG. 2 illustrates an example communication providing multi-dimensional audio at two audio outputting devices 214 and 216. A speaker 202 is communicating with a listener 204 and a listener 206 within a room 208. The speaker 202 is separated from the listener 204 and the listener 206 by a wall 210. To communicate with each other within the room 208, the speaker 202 is wearing the audio device 212, the listener 204 is wearing the audio device 214, and the listener 206 is wearing the audio device 216. Each of the audio device 212, the audio device 214, and the audio device 216 may function as both an audio outputting device and an audio transmitting device in some implementations. In FIG. 2, the audio device 212 is functioning as an audio transmitting device, while the audio device 214 and the audio device 216 are functioning as audio outputting devices.

Without the assistance of the audio devices 212, 214, and 216, the wall 210 may prevent the speaker 202 from speaking to the listener 204 and the listener 206 without an assistive device. Using the method of providing multi-dimensional audio to the audio devices 214 and 216 acting as audio outputting devices, the listener 204 may hear speaker 202 through the audio device 214, and the listener 206 may hear speaker 202 through the audio device 216. The multi-dimensional audio output means that the audio device 214 and the audio device 216 will have different audio outputs because each device is located in a different place relative to the audio device 212. For example, the audio device 214 may output the received audio at a higher volume from a left side speaker of the audio device 214 to indicate that the speaker 202 is to the left of the listener 204. Similarly, the audio device 216 may output the received audio at a higher volume from a right side speaker of the audio device 216 to indicate that the speaker 202 is to the right of the listener 206. This multi-dimensional output allows the listener 204 and the listener 206 to be aware of where the transmitted audio is coming from, within the room 208. In some implementations, the audio may be output in three-dimensional audio, providing an additional indication of the source of the transmitted audio.

To determine their location relative to one another, the audio devices 212, 214, and 216 continuously contribute to a shared map of the room 208. In one implementation, the shared map is based on position sensors in each device. The position sensors may be, for example, GPS sensors or sonar sensors. In another implementation the audio devices 212, 214, and 216 each include beacons that communicate with external sensors placed around a physical location (e.g., a building or large room) to provide fine resolution location data to complement or substitute GPS information so as to determine the very detailed and accurate locations of the audio devices 212, 214, and 216 within the shared map.

In another implementation, when the audio devices are used indoors, a shared map may be created using the cameras on each device and shared feature points. For example, a camera in the audio device may locate the corners of the wall 210 or of the outer walls of the room 208. An orientation sensor in the audio device can detect the orientation of the audio device relative to the shared feature points, substantially in real time, and pass this orientation information to the processor of the audio device. While the orientation sensor provides information about how the audio device has moved, the cameras continue to capture reference points. The orientation sensor may be an inertial measurement unit (IMU). The location of the audio device relative to the shared feature points may then be calculated and contributed to the shared map. Over time, the shared map becomes more robust, with each audio device in a space (e.g., audio devices 212, 214, and 216) continuously contributing information about its location relative to shared feature points.

The audio devices 212, 214, and 216 may use simultaneous location and mapping (SLAM) to calculate the location of the audio device relative to shared feature points. The location of the audio device relative to a shared feature point may be calculated using two images of the shared feature point captured by a camera on the audio device and an estimated distance traveled by the camera during the time elapsed between the two images. The orientation sensor provides the acceleration of the camera during the time elapsed between the two images. By taking the double integral of the acceleration of the camera, a rough estimate for the distance traveled by the camera may be obtained. Over time, with enough captured data, the rough estimates for distance traveled can provide an accurate shared map.

When the speaker 202 speaks, the audio device 212 picks up the audio. The audio may be transmitted over a shared communication network (e.g., a Wi-Fi network, a cellular network, or any other method of wireless communication) to audio devices 214 and 216, acting as audio outputting devices. In one implementation, shown in FIG. 2, the audio device 212 only transmits audio to audio outputting devices within a transmission zone (shown in FIG. 2 as the area between a broken line 218 and a broken line 220).

The area included in the transmission zone of the audio device 212 may be predetermined or may be a setting that a user of the audio device 212 may adjust to meet specific needs. In another implementation, the transmission zone of the audio device 212 may be automatically adjusted by the audio device 212 based on environmental characteristics of the area (e.g., the transmission zone may get smaller when the area is more crowded or noisy). The transmission zone allows the speaker 202 to transmit audio to audio outputting devices in a certain area, while not disturbing audio devices outside of the certain area. For example, the speaker 202 may wish to ask for something to be brought from the back of the room 208, where listener 204 and listener 206 are located. A listener (e.g., a listener 222), outside of the transmission zone wearing an audio device (e.g., an audio device 224) will not receive audio from the audio device 212. The transmission zone may change depending on which direction the speaker 202 is facing (or the orientation of the speaker's audio device 212). For example, if the speaker 202 wanted to transmit audio to the listener 206 and the listener 222, the speaker 202 may turn to the right, shifting the transmission zone enclosed by the broken lines 218 and 220.

In other implementations, the speaker 202 may select which listeners receive the transmitted audio through verbal or other commands to the audio device 212. For example, if the speaker 202 wishes to transmit audio only to coworkers in a certain department, the speaker 202 may say the name of the department to select listeners before speaking. In some implementations, the speaker 202 may be able to select individual listeners using this method, excluding other listeners from receiving the audio signal over the communications network. Nonverbal commands, such as specific gestures to a camera located on the audio device 212, may also be used to select listeners.

The shared map is used by the audio devices 212, 214, and 216 to provide multi-dimensional audio output based on where the audio devices 212, 214, and 216 are located. After the speaker 202 selects which audio devices will receive the audio output of the audio device 212 and transmits the audio output over the communication network, the audio devices 214 and 216, acting as audio outputting devices, determine their relative location relative to the audio device 212. The relative location of the audio device 214 relative to the audio device 212 indicates the distance between a center point of the audio device 214 and a center point of the audio device 212. Similarly, the relative location of the audio device 216 relative to the audio device 212 indicates the distance between a center point of the audio device 216 and the center point of the audio device 212.

When the audio devices 212, 214, and 216 each continuously contribute mapping information to the shared map, the shared map accumulates information about a shared space. Each of the audio devices 212, 214, and 216 use the shared map to determine the audio device's location on the shared map. Each of the audio devices 212, 214, and 216 then shares its location to a shared simulation. The shared simulation includes the shared information about the location of each of the audio devices 212, 214, and 216 within a shared space. The audio device 214 may use information from the shared simulation about the location of the audio device 212 within the shared space and information about the location of the audio device 214 within the shared space to calculate the relative location of the audio device 212 to the audio device 214. Similarly, the audio device 216 may use information from the shared simulation about the location of the audio device 212 within the shared space and information about the location of the audio device 216 within the shared space to calculate the relative location of the audio device 212 to the audio device 216. The shared simulation may be implemented using a client-server model or a peer-to-peer model.

The audio devices 214 and 216 also determine their relative orientation to the audio device 212. The relative orientation of the audio device 214 to the audio device 212 provides more information about the angle between the audio device 214 and the audio device 212. While the relative location between the audio device 214 and the audio device 212 provides the angle between the center point of the audio device 214 and the center point of the audio device 212, the relative orientation between the audio device 214 and the audio device 212 indicates the angle between the audio device 214 and the audio device 212. An axis of an audio device is roughly aligned with the ears of the listener. The angle of the axis indicates the orientation of the audio device. In one implementation, IMUs in the audio devices 212, 214, and 216 may provide information about the orientation of each of the audio devices 212, 214, and 216 respectively. In another implementation, external sensors detecting each of the audio devices 212, 214, and 216 may provide information about each of the audio devices 212, 214, and 216, respectively. Information about the orientations of the audio devices 212, 214, and 216 may be contributed to the shared map by each of the audio devices 212, 214, and 216. When the audio device 214 determines the relative orientation of the audio device 214 to the audio device 212, it may use the information contributed to the shared simulation in its determination.

In one implementation, a receiving angle and a transmission angle are calculated. The receiving angle is the angle between a forward vector of the audio device 214 (or the audio device 216) and the center point of the audio device 212. The transmission angle is the angle between a forward vector of the audio device 212 and a center point of the audio device 214 (or the audio device 216). When a transmission is triggered by the audio device 212, each of the audio device 212, the audio device 214, and the audio device 216 perform calculations to calculate the receiving angle and the transmission angle. The receiving angle and the transmission angle are used to determine whether the audio device 214 and the audio device 216 meet transmission criteria. For example, the transmission criteria may be the transmission area defined by the broken line 218 and the broken line 220. If the transmission angle determines that an audio device is outside of the transmission area, the audio device outside of the transmission area will not produce any sound. If, as is the case for the audio device 214 and the audio device 216, the audio device is inside the transmission area (or the audio device meets another transmission criteria), the receiving angle is calculated, and transmission continues.

After the audio devices 214 and 216 determine their relative location from the audio device 212 and their relative orientation relative to the audio device 212, the audio devices 214 and 216 process the audio signal from the audio device 212 using the relative location and relative orientation to create an augmented audio signal for each audio device. Each audio device 214 and 216 outputs its augmented audio signal to adjust the relative magnitude/timing of audio outputs from each speaker of the audio devices to indicate where, physically, the audio signal originated. For example, in FIG. 2, the audio device 214 outputs the audio at a higher volume from the left speaker of the audio device 214, to indicate that the audio device 212 acting as an audio transmitting device is to the left of the audio device 214. Similarly, the audio device 216 outputs the audio at a higher volume from the right speaker of the audio device 216, to indicate that the audio device 212 acting as an audio transmitting device is to the right of the audio device 216. The augmented audio signal may be processed using a head-related transfer function based on the relative location and orientation of an audio device acting as an audio outputting device relative to an audio device acting as an audio transmitting device. In some implementations, the processing may occur directly on the audio device 214 or on the audio device 216. In other implementations, the processing may occur on another computing device communicatively connected to the audio device 212, the audio device 214, and the audio device 216 through a communication network (e.g., the cloud, a cellular network, or WIFI).

The augmented audio signal may be output from the audio device 214 and the audio device 216 using, for example, without limitation, open speakers, headsets, earbuds, or any other type of headphones or listening device. In some implementations, more than two audio outputs may exist on each audio device, to provide the user with further guidance about the direction of the sound. An arrow 226 shows the direction that the listener 204 will turn in response to audio output from the audio device 214. An arrow 228 shows the direction that the listener 206 will turn in response to audio output from the audio device 216.

Figure 3:
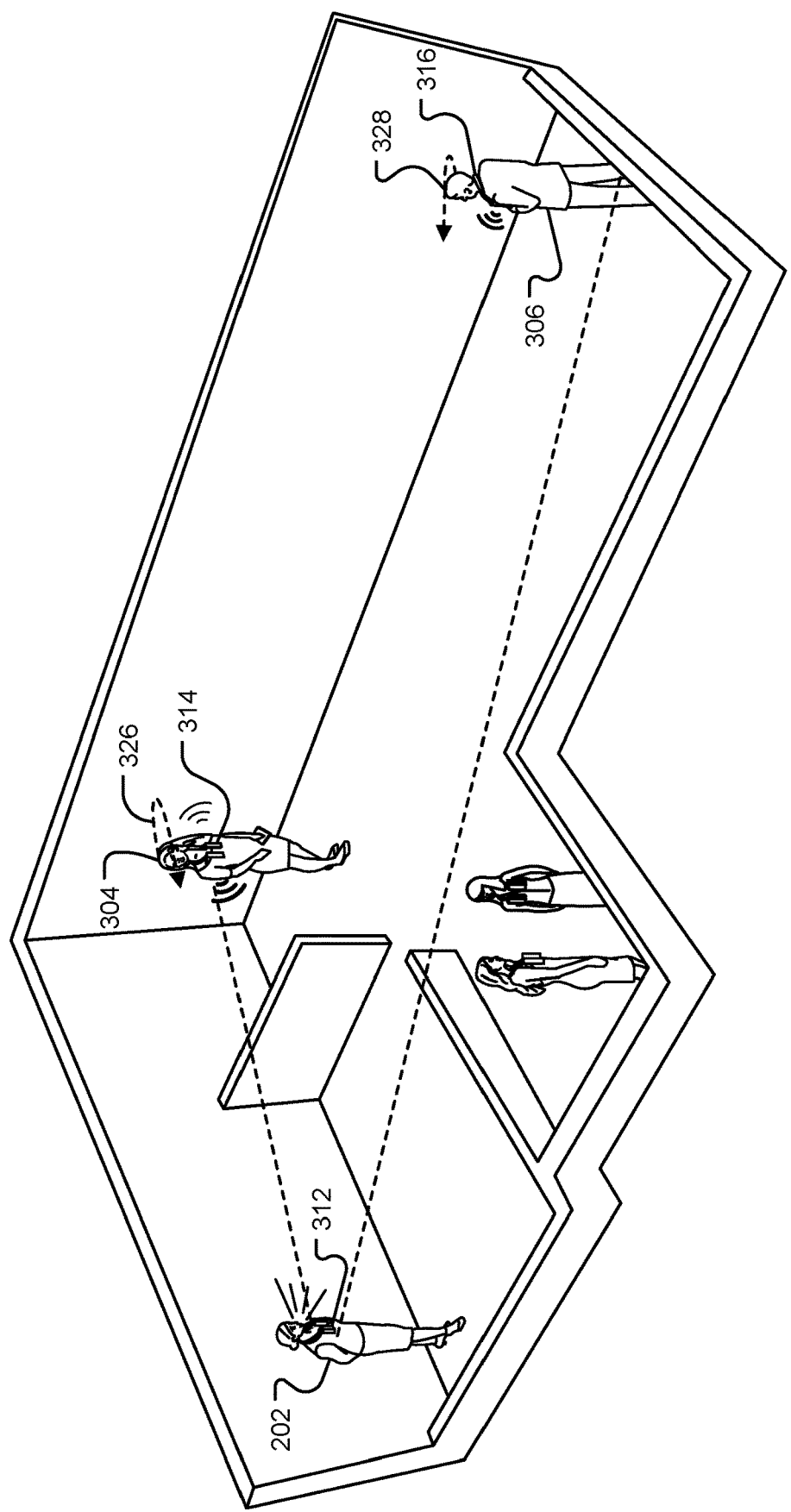
FIG. 3 illustrates an example communication providing multi-dimensional audio at two audio outputting devices.

FIG. 3 illustrates an example communication providing multi-dimensional audio at audio outputting devices 314 and 316. audio signal is received from an audio transmitting device 312 and is processed by the audio outputting devices 314 and 316 to output an augmented audio signal based on the relative location and orientation of the audio transmitting device 312 relative to the audio outputting devices 314 and 316. The augmented signal is output by the audio outputting devices 314 and 316 differently based on the relative location and orientation of the audio transmitting device 312. For example, because the audio transmitting device 312 is to the left of the audio outputting device 314, the augmented audio signal is presented so that it is louder from the left speaker of the audio outputting device 314. Similarly, because the audio transmitting device 312 is to the right of the audio outputting device 316, the augmented audio signal is presented so that it is louder from the right speaker of the audio outputting device 316. In response to the output audio signal from the audio outputting device 314, a listener 304 turns in the direction of an arrow 326, towards a speaker 302. Similarly, in response to the audio output from the audio outputting device 316, a listener 306 turns in the direction of an arrow 328, also towards the speaker 302.

Figure 4:
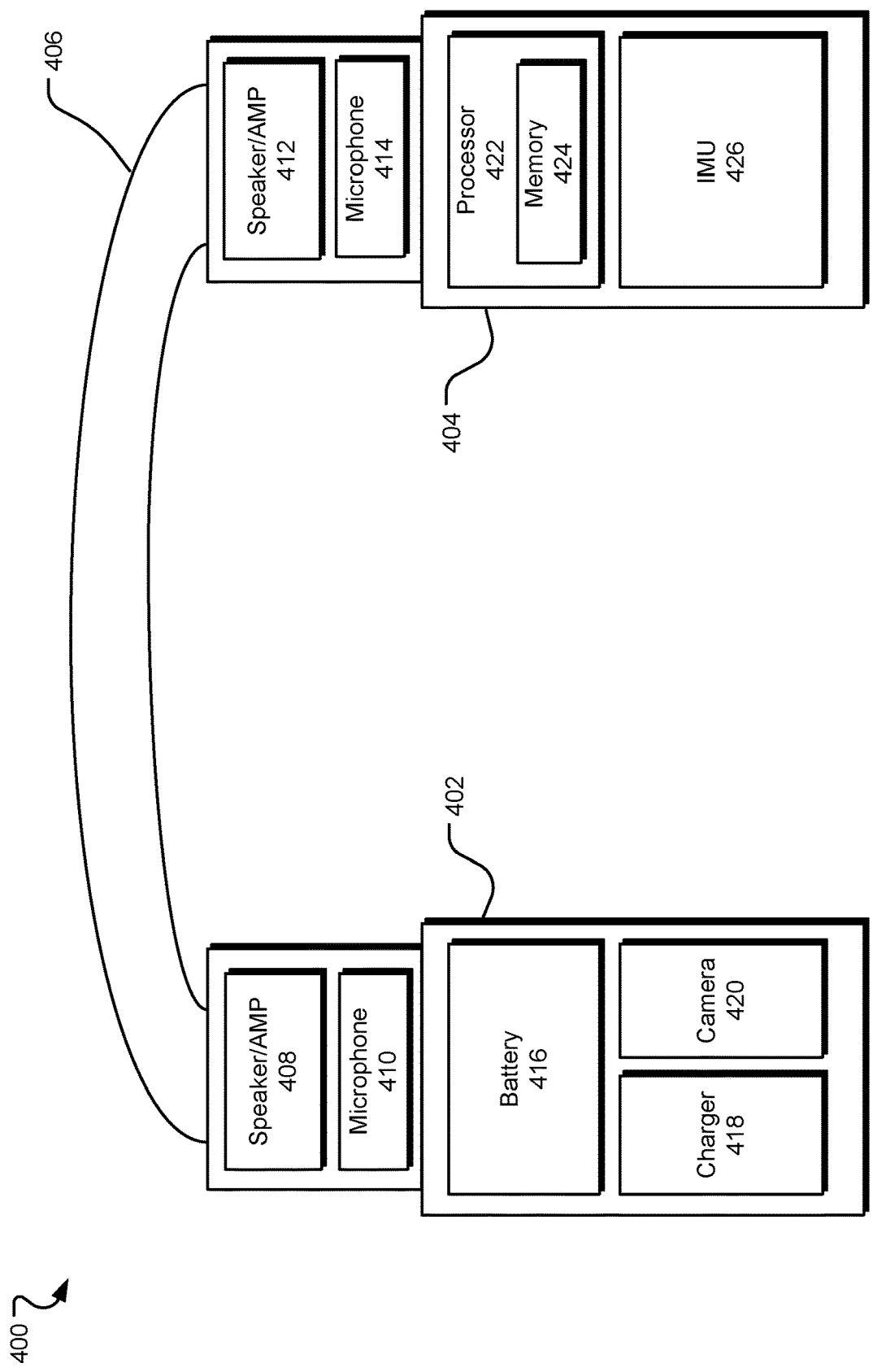
FIG. 4 illustrates a schematic of an example device that may be used for providing multi-dimensional audio at an audio outputting device.

FIG. 4 illustrates a schematic of an example device 400 that may be used for providing multi-dimensional audio at an audio outputting device. The device 400 includes a left electronic enclosure 402 and a right electronic enclosure 404 connected by a flexible connector 406. In the illustrated implementation, the flexible connector 406 includes wiring or other connections to provide power and to communicatively connect the left electronic enclosure 402 with the right electronic enclosure 404, although other implementations may employ wireless communications, a combination of wireless and wired communication, distributed power sources, and other variations in architecture. The left electronic enclosure 402 and the right electronic enclosure 404 are substantially weight-balanced to prevent the device 400 from sliding off a user's neck unexpectedly. In some implementations, the electronic components and the left electronic enclosure 402 weigh substantially the same as the electronic components and the right electronic enclosure 404. In other implementations, any type of weight or re-distributed may be added to either the left electronic enclosure 402 or the right electronic enclosure 404 to balance the weights of the left electronic enclosure 402 and the right electronic enclosure 404.

In the device 400 of FIG. 4, the left electronic enclosure 402 includes a speaker 408 and a microphone 410. The right electronic enclosure 404 also includes a speaker 412 and a microphone 414. The speaker 408 may be calibrated to deliver audio to the left ear of a user while the speaker 412 may be calibrated to deliver audio to the right ear of a user. In some implementations, the speaker 408 and the speaker 412 may be replaced with earbuds or other types of headphones to provide the audio output for the device 400. The microphone 410 and the microphone 414 receive audio from the user of the device 400. In some implementations, there may be only one microphone on the device 400. In other implementations, an external microphone, such as a microphone integrated with a set of headphones, may be included in place of the microphone 410 and the microphone 414.

The left electronic enclosure 402 further includes a battery 416, a charger 418, and a camera 420. The charger 418 charges the battery 416 and may have a charging input or may charge the battery through proximity charging. The battery 416 may be any type of battery suitable to power the device 400. The camera 420 provides a wide field of view through use of a wide angle or fish-eye lens, although other lenses may be employed. The camera 420 is angled to provide a wide field of view. The angle of the camera 420 may change depending on the anatomy of the user of the device 400. For example, the camera 420 may be at one angle for a user with a fairly flat chest and at a different angle for a user with a fuller chest. In some implementations, the user may adjust the camera 420 manually to achieve a good angle for a wide field of view. In other implementations, the device 400 may automatically adjust the camera 420 when a new user uses the device 400.

The right electronic enclosure 404 further includes a processor 422 with memory 424 and an IMU 426. The processor 422 provides onboard processing for the device 400. The processor 422 may include a connection to a communication network (e.g., a cellular network or WI-FI network). The memory 424 on the processor 422 may store information relating to the device 400, including, without limitation, a shared map of a physical space, user settings, and user data. The processor 422 may additionally perform calculations to provide remote multi-dimensional audio to the user of the device 400. The IMU 426 provides information about the movement of the device 400 in each dimension. The information provided by the IMU may assist the device 400 in determining its location for contribution to a shared map.

The device 400 may include additional electronic components in either the left electronic enclosure 402 or the right electronic enclosure 404. For example, the device 400 may include, without limitation, biometric sensors, haptic feedback outputs and haptic drivers, beacons for communication with external sensors placed in a physical space, and user input components, such as buttons, switches, or touch sensors.

Figure 5:
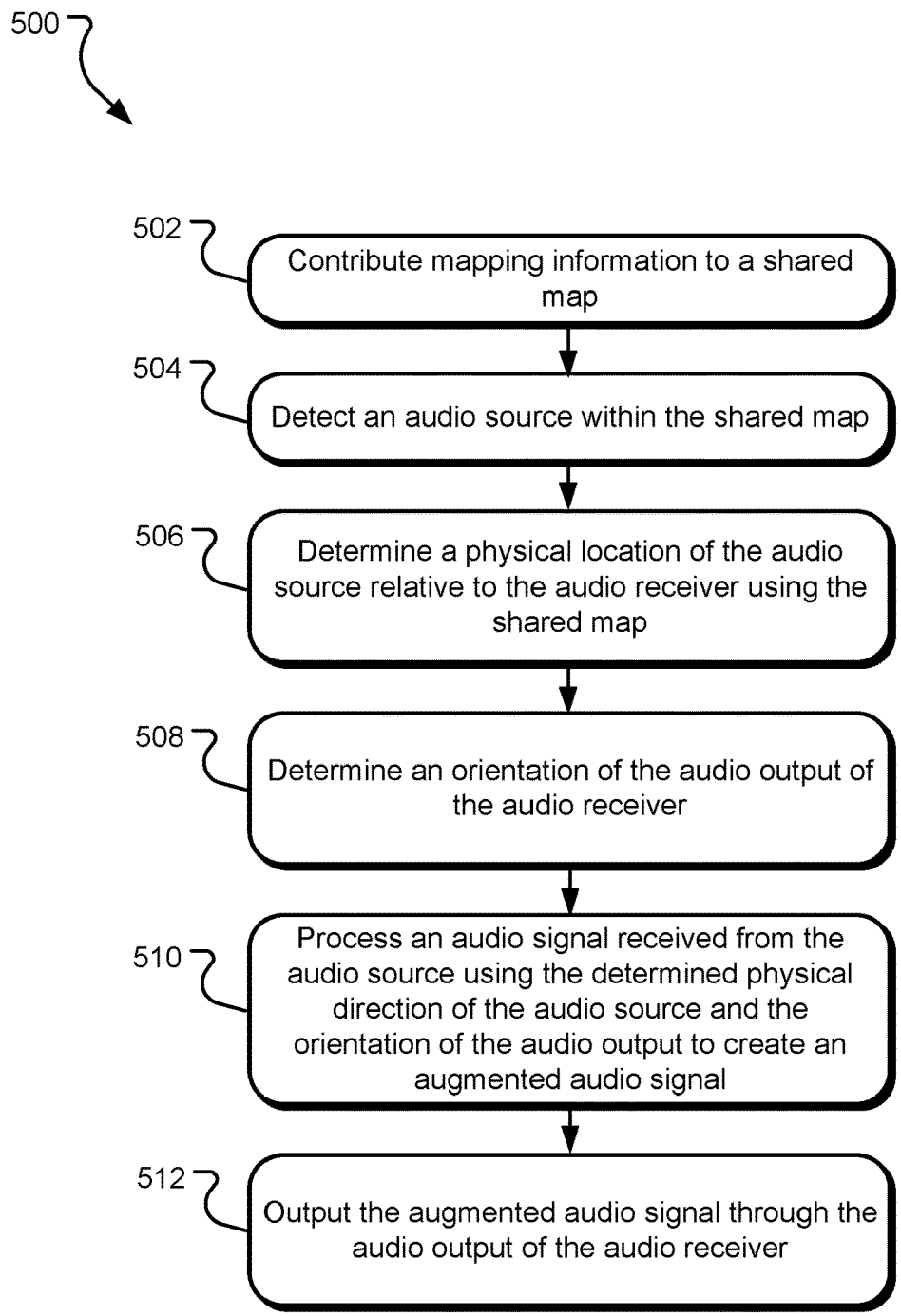
FIG. 5 illustrates example operations for providing multi-dimensional audio at an audio outputting device.

FIG. 5 illustrates example operations for providing multi-dimensional audio at an audio outputting device. A contributing operation 502 contributes mapping information continuously or periodically to a shared map to create a shared simulation. Each of the audio devices uses the shared map to determine the audio device's location on the shared map. Each of the audio devices then shares its location to a shared simulation. The shared simulation includes the shared information about the location of each of the audio devices within a shared space. In one implementation, the shared simulation is created using GPS or other position sensing components in audio devices acting as the audio transmitting device and the audio outputting device. In another implementation, sensors may be placed around a physical space (e.g., a building or a room) and may communicate with beacons on the audio transmitting device and the audio outputting device. In yet another implementation, the shared map is created using cameras and orientation sensors (such as IMUs) on the audio devices. The cameras on the audio devices detect common physical points (such as corners on the walls) to create a map of the room. Such common physical points can be recognized and/or registered among multiple devices (e.g., via a mapping service) and contributed to a shared map. The orientation sensors and cameras in the audio devices provide information about how the audio devices have moved relative to the common physical points. Over time, this information is communicated to the shared map, which is used to build the shared simulation.

When the audio outputting device is ready to receive audio output, a detecting operation 504 detects an audio transmitting device within the shared simulation. Because the audio transmitting device and the audio outputting device are both continuously contributing to the shared simulation and both have access to the shared simulation, the audio outputting device may detect the location of the audio transmitting device within the shared simulation.

After the audio outputting device has detected the location of the audio transmitting device, a first determining operation 506 determines a physical location of the audio transmitting device relative to the audio outputting device using the shared simulation. The shared simulation provides the audio outputting device with information about the location of the audio transmitting device. Using that information and information about the location of the audio outputting device, the processor of the audio outputting device determines the physical location of the audio transmitting device relative to the audio outputting device.

A second determining operation 508 determines an orientation of the audio transmitting device relative to the audio outputting device. As in the first determining operation 506, the shared map provides the audio outputting device with information about the location of the audio transmitting device. Using that information and information about the location of the audio outputting device, the processor of the audio outputting device determines the orientation of the audio transmitting device relative to the audio outputting device.

A processing operation 510 processes an audio signal received from the audio transmitting device using the determined physical location of the audio transmitting device and the orientation of the audio transmitting device to create an augmented audio signal. In some implementations, the audio outputting device may use a head-related transfer function or another method to create an augmented audio signal that makes it sound like the received audio signal is coming from a certain direction. In other implementations, the processing and calculations may occur on an external computing device communicatively connected to the audio outputting device.

An outputting operation 512 outputs the augmented audio signal through the audio output of the audio outputting device. The augmented audio signal is output differently based on the relative physical location and relative orientation of the audio transmitting device. If, for example, the audio transmitting device is located to the left of the audio outputting device, the augmented audio signal may be output so that it is louder in the left speaker of the audio outputting device. The presentation of the augmented audio signal allows the user of the audio outputting device to determine the general direction of origination of the audio signal.

Figure 6:
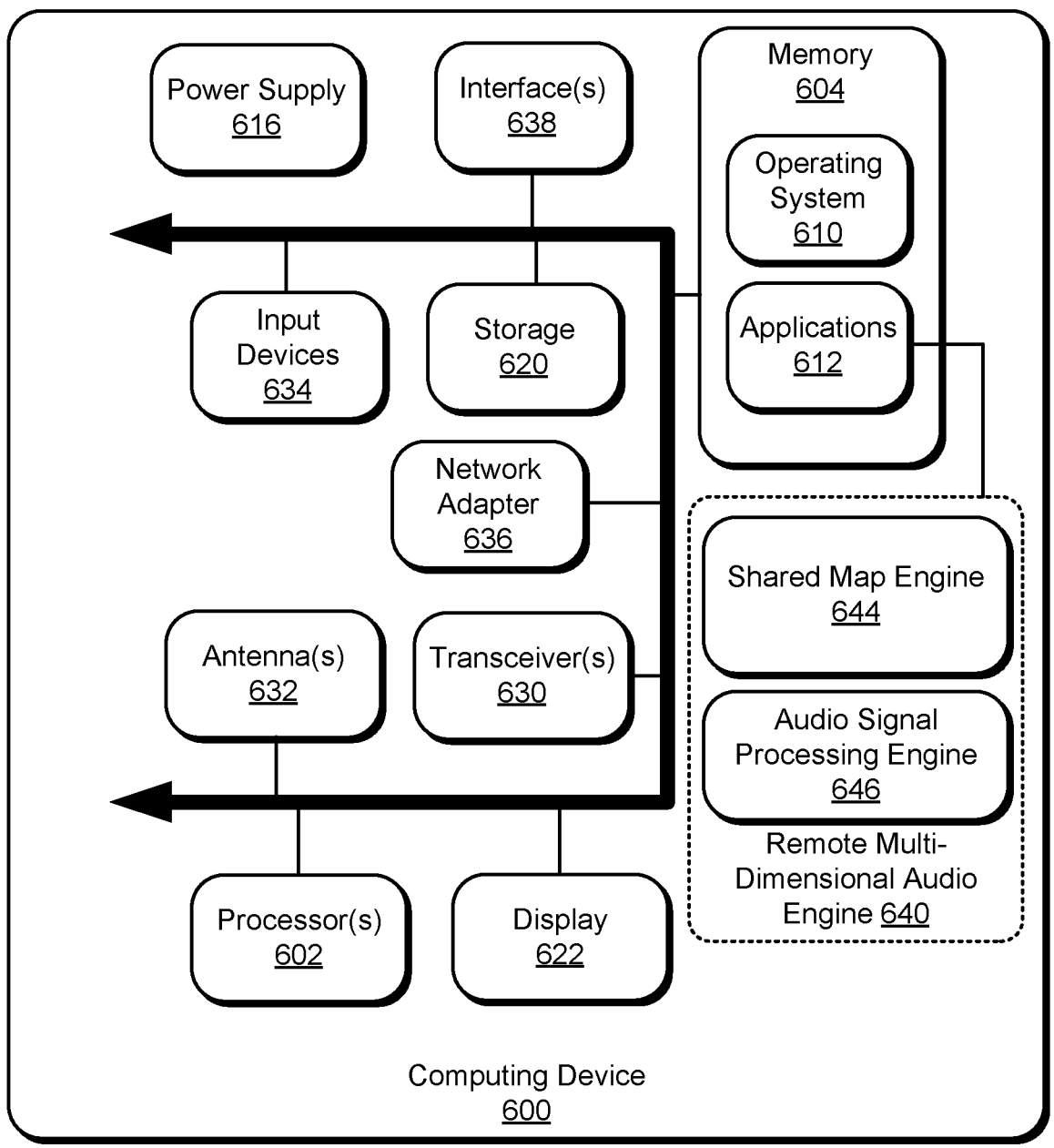
FIG. 6 illustrates an example computing device for use in providing multi-dimensional audio at an audio outputting device.

FIG. 6 illustrates an example computing device 600 for use in providing multi-dimensional audio to an audio outputting device. The example computing device 600 may be used to process audio signals remotely to provide multi-dimensional audio from the audio transmitting device to the audio outputting device. The computing device 600 may be a client device, such as a laptop, mobile device, desktop, tablet, or a server/cloud device. The computing device 600 includes one or more processor(s) 602, and a memory 604. The memory 604 generally includes both volatile memory (e.g., RAM) and non-volatile memory (e.g., flash memory). An operating system 610 resides in the memory 604 and is executed by the processor(s) 602.

One or more application programs 612 modules or segments, such as a remote multi-dimensional audio engine 640 are loaded into the memory 604 and/or storage 620 and executed by the processor(s) 602. The application programs 612 or modules may include the remote multi-dimensional audio engine 640 implemented by a shared map engine 644 and audio signal processing engine 646 which may be embodied in instructions stored in the memory 604 and/or storage 620 and executed by the processor(s) 602. Data such as user preferences, hardware configurations, and hardware responses may be stored in the memory 604 or storage 620 and may be retrievable by the processor(s) 602 for use by the remote multi-dimensional audio engine 640, the shared map engine 644, and the audio signal processing engine 646. The storage 620 may be local to the computing device 600 or may be remote and communicatively connected to the computing device 600 and may include another server. The storage 620 may store resources that are requestable by client devices (not shown).

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630 which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of communication device. The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638 such as a serial port interface, parallel port, or universal serial bus (USB). The computing device 600 may further include a display 622 such as a touchscreen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example audio outputting device is provided. The audio outputting device is configured to execute a process. The process includes determining a relative physical location of an audio transmitting device relative to the audio outputting device in a shared map of a physical space, the shared map being shared between the audio transmitting device and the audio outputting device. The process further includes determining an orientation of the audio outputting device relative to the audio transmitting device and processing an audio signal received from the audio transmitting device via a communication network using the determined orientation of the audio outputting device relative to the audio transmitting device and the relative physical location of the audio transmitting device to create an augmented audio signal. The augmented audio signal is output through at least one audio output on the audio outputting device, the augmented audio signal being output in a manner that indicates a relative physical direction of the audio transmitting device to the audio outputting device in the shared map of the physical space.

An example audio outputting device of any previous audio outputting device is provided, where the augmented signal is output in a manner that further indicates the three-dimensional relative physical direction of the audio transmitting device to the audio outputting device in the shared map of the physical space.

An example audio outputting device of any previous audio outputting device is provided, where the process executed by the audio outputting device also includes selecting the audio outputting device based on its location relative to the audio transmitting device.

An example audio outputting device of any previous audio outputting device is provided, where the process executed by the audio outputting device also includes selecting the audio outputting device based on a user input received by the audio transmitting device.

An example audio outputting device of any previous audio outputting device is provided, where the audio transmitting device contributes mapping information continuously to the shared map based on information from a first position sensor located in the audio transmitting device and the audio outputting device contributes mapping information continuously to the shared map based on information from a second position sensor located in the audio outputting device.

An example audio outputting device of any previous audio outputting device is provided, where the audio transmitting device contributes mapping information continuously to the shared map based on information from a first orientation sensor located in the audio transmitting device and the audio outputting device contributes mapping information continuously to the shared map based on information from a second orientation sensor located in the audio outputting device.

An example audio outputting device of any previous audio outputting device is provided, where the shared map is created by information received from external sensors, the external sensors being in communication with the audio transmitting device and the audio outputting device.

An example method includes determining a relative physical location of an audio transmitting device relative to an audio outputting device in a shared map of a physical space, the shared map being shared between the audio transmitting device and the audio outputting device. The method also includes determining an orientation of the audio outputting device relative to the audio transmitting device and processing an audio signal received from the audio transmitting device via a communication network using the determined orientation of the audio outputting device relative to the audio transmitting device and the relative physical location of the audio transmitting device to create an augmented audio signal. The method also outputs the augmented audio signal through at least one audio output on the audio outputting device, the augmented audio signal being output in a manner that indicates a relative physical direction of the audio transmitting device to the audio outputting device in the shared map of the physical space.

An example method of any previous method is provided, where the augmented signal is output in a manner that further indicates the three-dimensional relative physical direction of the audio transmitting device to the audio outputting device in the shared map of the physical space.

An example method of any previous method further includes selecting the audio outputting device based on its position relative to the position and orientation of the audio transmitting device.

An example method of any previous method further includes selecting the audio outputting device based on a user input received by the audio transmitting device.

An example method of any previous method is provided, where the audio transmitting device contributes mapping information continuously to the shared map based on information from a first position sensor located in the audio transmitting device and the audio outputting device contributes mapping information continuously to the shared map based on information from a second position sensor located in the audio outputting device.

An example method of any previous method is provided, where the audio transmitting device contributes mapping information continuously to the shared map based on information from a first orientation sensor located in the audio transmitting device and the audio outputting device contributes mapping information continuously to the shared map based on information from a second orientation sensor located in the audio outputting device.

An example method of any previous method is provided, where the shared map is created by information received from external sensors, the external sensors being in communication with the audio transmitting device and the audio outputting device.

An example system includes means for determining a relative physical location of an audio transmitting device relative to an audio outputting device in a shared map of a physical space, the shared map being shared between the audio transmitting device and the audio outputting device. The system also includes means for determining an orientation of the audio outputting device relative to the audio transmitting device and processing an audio signal received from the audio transmitting device via a communication network using the determined orientation of the audio outputting device relative to the audio transmitting device and the relative physical location of the audio transmitting device to create an augmented audio signal. The system also includes means for outputting the augmented audio signal through at least one audio output on the audio outputting device, the augmented audio signal being output in a manner that indicates a relative physical direction of the audio transmitting device to the audio outputting device in the shared map of the physical space.

An example system of any preceding system is provided, where the augmented signal is output in a manner that further indicates a three-dimensional relative physical direction of the audio transmitting device to the audio outputting device in the shared map of the physical space.

An example system of any preceding system includes means for selecting the audio outputting device based on its position relative to the position and orientation of the audio transmitting device.

An example system of any preceding system is provided, where the audio transmitting device contributes mapping information continuously to the shared map based on information from a first position sensor located in the audio transmitting device and the audio outputting device contributes mapping information continuously to the shared map based on information from a second position sensor located in the audio outputting device.

An example system of any preceding system is provided, where the audio transmitting device contributes mapping information continuously to the shared map based on information from a first orientation sensor located in the audio transmitting device and the audio outputting device contributes mapping information continuously to the shared map based on information from a second orientation sensor located in the audio outputting device.

An example system of any preceding system is provided, where the shared map is created by information received from external sensors, the external sensors being in communication with the audio transmitting device and the audio outputting device.

Example one or more tangible processor-readable storage media are embodied with instructions for executing on one or more processors and circuits of a computing device a process including determining a relative physical location of an audio transmitting device relative to an audio outputting device in a shared map of a physical space, the shared map being shared between the audio transmitting device and the audio outputting device. The process further includes determining an orientation of the audio outputting device relative to the audio transmitting device. The process further includes processing an audio signal received from the audio transmitting device via a communication network using the determined orientation of the audio outputting device relative to the audio transmitting device and the relative physical location of the audio transmitting device to create an augmented audio signal. The process further includes outputting the augmented audio signal through at least one audio output on the audio outputting device, the augmented audio signal being output in a manner that indicates a relative physical direction of the audio transmitting device to the audio outputting device in the shared map of the physical space.

Another example one or more tangible processor-readable storage media are embodied with instructions for executing on one or more processors and circuits of a device a process of any preceding process, further including selecting the audio outputting device based on its position relative to the position and orientation of the audio transmitting device.

Another example one or more tangible processor-readable storage media are embodied with instructions for executing on one or more processors and circuits of a device a process of any preceding process, further including selecting the audio outputting device based on a user input received by the audio transmitting device.

Another example one or more tangible processor-readable storage media are embodied with instructions for executing on one or more processors and circuits of a device a process of any preceding process where the audio transmitting device contributes mapping information continuously to the shared map based on information from a first position sensor located in the audio transmitting device and the audio outputting device contributes mapping information continuously to the shared map based on information from a second position sensor located in the audio outputting device.

Another example one or more tangible processor-readable storage media are embodied with instructions for executing on one or more processors and circuits of a device a process of any preceding process where the audio transmitting device contributes mapping information continuously to the shared map based on information from a first orientation sensor located in the audio transmitting device and the audio outputting device contributes mapping information continuously to the shared map based on information from a second orientation sensor located in the audio outputting device.

Another example one or more tangible processor-readable storage media are embodied with instructions for executing on one or more processors and circuits of a device a process of any preceding process where the shared map is created by information received from external sensors, the external sensors being in communication with the audio transmitting device and the audio outputting device.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. An audio outputting device configured to execute a process comprising:
   determining a relative physical location of an audio transmitting device relative to the audio outputting device in a shared map of a physical space, the shared map being shared between the audio transmitting device and the audio outputting device;
   determining an orientation of an axis of the audio outputting device relative to the audio transmitting device;
   processing an audio signal received from the audio transmitting device via a communication network using the determined orientation of the axis of the audio outputting device relative to the audio transmitting device and the relative physical location of the audio transmitting device to create an augmented audio signal; and
   outputting the augmented audio signal through at least one audio output on the audio outputting device, the augmented audio signal being output in a manner that indicates a relative physical direction of the audio transmitting device to the audio outputting device in the shared map of the physical space.

2. The audio outputting device of claim 1, wherein the augmented audio signal is output in a manner that further indicates a three-dimensional relative physical direction of the audio transmitting device to the audio outputting device in the shared map of the physical space.

3. The audio outputting device of claim 1, the process further comprising:
   selecting the audio outputting device based on its location relative to the audio transmitting device.

4. The audio outputting device of claim 1, the process further comprising:
   selecting the audio outputting device based on a user input received by the audio transmitting device.

5. The audio outputting device of claim 1, wherein the audio transmitting device contributes mapping information continuously to the shared map based on information from a first position sensor located in the audio transmitting device and the audio outputting device contributes mapping information continuously to the shared map based on information from a second position sensor located in the audio outputting device.

6. The audio outputting device of claim 1, wherein the audio transmitting device contributes mapping information continuously to the shared map based on information from a first orientation sensor located in the audio transmitting device and the audio outputting device contributes mapping information continuously to the shared map based on information from a second orientation sensor located in the audio outputting device.

7. The audio outputting device of claim 1, wherein the shared map is created by information received from external sensors, the external sensors being in communication with the audio transmitting device and the audio outputting device.

8. The audio outputting device of claim 1, wherein the augmented audio signal is output in a manner that further indicates the determined orientation of the axis of the audio outputting device to the audio transmitting device in the shared map of the physical space.

9. A method comprising:
   determining a relative physical location of an audio transmitting device relative to an audio outputting device in a shared map of a physical space, the shared map being shared between the audio transmitting device and the audio outputting device;
   determining an orientation of an axis of the audio outputting device relative to the audio transmitting device;
   processing an audio signal received from the audio transmitting device via a communication network using the determined orientation of the axis of the audio outputting device relative to the audio transmitting device and the relative physical location of the audio transmitting device to create an augmented audio signal; and
   outputting the augmented audio signal through at least one audio output on the audio outputting device, the augmented audio signal being output in a manner that indicates a relative physical direction of the audio transmitting device to the audio outputting device in the shared map of the physical space.

10. The method of claim 9, wherein the augmented audio signal is output in a manner that further indicates a three-dimensional relative physical direction of the audio transmitting device to the audio outputting device in the shared map of the physical space.

11. The method of claim 9, further comprising:
    selecting the audio outputting device based on its location relative to the location and orientation of the axis of the audio transmitting device.

12. The method of claim 9, further comprising:
    selecting the audio outputting device based on a user input received by the audio transmitting device.

13. The method of claim 9, wherein the audio transmitting device contributes mapping information continuously to the shared map based on information from a first position sensor located in the audio transmitting device and the audio outputting device contributes mapping information continuously to the shared map based on information from a second position sensor located in the audio outputting device.

14. The method of claim 9, wherein the audio transmitting device contributes mapping information continuously to the shared map based on information from a first orientation sensor located in the audio transmitting device and the audio outputting device contributes mapping information continuously to the shared map based on information from a second orientation sensor located in the audio outputting device.

15. The method of claim 9, wherein the shared map is created by information received from external sensors, the external sensors being in communication with the audio transmitting device and the audio outputting device.

16. One or more tangible processor-readable storage media embodied with instructions for executing on one or more processors and circuits of a computing device a process comprising:
- determining a relative physical location of an audio transmitting device relative to an audio outputting device in a shared map of a physical space, the shared map being shared between the audio transmitting device and the audio outputting device;
- determining an orientation of an axis of the audio outputting device relative to the audio transmitting device;
- processing an audio signal received from the audio transmitting device via a communication network using the determined orientation of the axis of the audio outputting device relative to the audio transmitting device and the relative physical location of the audio transmitting device to create an augmented audio signal; and
- outputting the augmented audio signal through at least one audio output on the audio outputting device, the augmented audio signal being output in a manner that indicates a relative physical direction of the audio transmitting device to the audio outputting device in the shared map of the physical space.

17. The one or more tangible processor-readable storage media of claim 16, wherein the process further comprises:
selecting the audio outputting device based on its location relative to the location and orientation of the axis of the audio transmitting device.

18. The one or more tangible processor-readable storage media of claim 16, wherein the process further comprises:
selecting the audio outputting device based on a user input received by the audio transmitting device.

19. The one or more tangible processor-readable storage media of claim 16, wherein the audio transmitting device contributes mapping information continuously to the shared map based on information from a first position sensor located in the audio transmitting device and the audio outputting device contributes mapping information continuously to the shared map based on information from a second position sensor located in the audio outputting device.

20. The one or more tangible processor-readable storage media of claim 16, wherein the audio transmitting device contributes mapping information continuously to the shared map based on information from a first orientation sensor located in the audio transmitting device and the audio outputting device contributes mapping information continuously to the shared map based on information from a second orientation sensor located in the audio outputting device.

21. The one or more tangible processor-readable storage media of claim 16, wherein the shared map is created by information received from external sensors, the external sensors being in communication with the audio transmitting device and the audio outputting device.

* * * * *